(12) United States Patent
Alexander

(10) Patent No.: US 11,037,489 B1
(45) Date of Patent: Jun. 15, 2021

(54) HIGH STRENGTH TRANSPARENT ARTICLES WITH DIGITAL DISPLAY ARRAYS AND CAPABILITIES

(71) Applicant: Jerry Dewanye Alexander, Memphis, TN (US)

(72) Inventor: Jerry Dewanye Alexander, Memphis, TN (US)

( * ) Notice: Subject to any disclaimer, the term of this patent is extended or adjusted under 35 U.S.C. 154(b) by 43 days.

(21) Appl. No.: 15/932,923

(22) Filed: May 22, 2018

Related U.S. Application Data

(60) Provisional application No. 62/603,276, filed on May 22, 2017.

(51) Int. Cl.
| | | |
|---|---|---|
| *G09G 3/3208* | (2016.01) | |
| *G06F 3/01* | (2006.01) | |
| *G09G 3/19* | (2006.01) | |

(52) U.S. Cl.
CPC .............. *G09G 3/3208* (2013.01); *G06F 3/01* (2013.01); *G09G 3/19* (2013.01)

(58) Field of Classification Search
CPC ...... G09G 3/3208; B60Q 1/268; B60Q 1/503; B60Q 1/50; B60Q 1/302; B60Q 1/444; B60Q 2900/30; B60Q 3/68; B60Q 3/745; G09F 13/22; G09F 2013/227; G09F 21/04; G09F 3/203; G09F 9/33; Y10T 428/24736; B60R 25/104; B62J 17/04; H01L 27/32
USPC ........................................................ 345/501
See application file for complete search history.

(56) References Cited

U.S. PATENT DOCUMENTS

| | | | | |
|---|---|---|---|---|
| 5,905,434 A | * | 5/1999 | Steffan ..................... | B60Q 1/50 116/28 R |
| 6,124,783 A | * | 9/2000 | Alexander ............ | B60R 25/104 340/425.5 |
| 7,048,422 B1 | * | 5/2006 | Solomon ................ | B60Q 1/268 345/76 |
| 7,866,861 B2 | * | 1/2011 | Alexander ............... | B60Q 1/50 362/503 |
| 8,104,895 B2 | * | 1/2012 | Quach .................. | G03B 21/604 353/20 |
| 9,234,642 B2 | * | 1/2016 | Auyeung ............... | F21V 29/503 |
| 9,767,719 B2 | * | 9/2017 | Li .......................... | G09F 13/005 |
| 2002/0136026 A1 | * | 9/2002 | Alexander, Sr. ...... | G02B 6/0095 362/559 |
| 2005/0157513 A1 | * | 7/2005 | Alexander ............... | B60Q 1/50 362/503 |

(Continued)

FOREIGN PATENT DOCUMENTS

WO WO-2008090909 A1 * 7/2008 ............ C04B 35/443

*Primary Examiner* — Sheree N Brown

(57) ABSTRACT

Display materials made from resilient clear, transparent materials on which components such as organic light emitting diodes, LED sensor materials, and the like, have laminated to or on, embedded within, attached to, or applied to are provided. Such clear transparent display materials, including transparent aluminum alloys, transparent wood, transparent ceramic spinel, transparent invisible metals, and other like exotic materials, do not exhibit susceptibility to cracking, chipping, fraying, or otherwise breaking without significant harmful force applied thereto. The combination of lighted components thereto and/or therein allows for the ability to display letters, numbers, and/or graphic images on the interior or exterior of such high strength transparent articles.

17 Claims, 13 Drawing Sheets

(56) References Cited

U.S. PATENT DOCUMENTS

| | | | | |
|---|---|---|---|---|
| 2007/0019424 | A1* | 1/2007 | Alexander | G09F 13/04 |
| | | | | 362/488 |
| 2008/0042926 | A1* | 2/2008 | Egi | C09K 11/06 |
| | | | | 345/32 |
| 2009/0134986 | A1* | 5/2009 | Bauer | B60R 25/104 |
| | | | | 340/426.23 |
| 2011/0006327 | A1* | 1/2011 | Park | H01L 27/3213 |
| | | | | 257/98 |
| 2012/0241811 | A1* | 9/2012 | Kim | H01L 51/5253 |
| | | | | 257/100 |
| 2014/0098085 | A1* | 4/2014 | Lee | G06F 3/04815 |
| | | | | 345/419 |
| 2015/0301782 | A1* | 10/2015 | Kim | G06F 3/1446 |
| | | | | 345/1.3 |
| 2016/0125772 | A1* | 5/2016 | Li | B44F 1/10 |
| | | | | 40/544 |

* cited by examiner

HIGH STRENGTH TRANSPARENT ARTICLES WITH DIGITAL DISPLAY ARRAYS AND CAPABILITIES

CROSS-REFERENCE TO RELATED APPLICATION

This application claims priority of U.S. Provisional Patent Application No. 62/603,276, filed on May 23, 2017, the entirety of such prior application, specification, drawings, and the like, being incorporated herein by reference.

FIELD OF THE INVENTION

Display materials made from resilient clear, transparent materials on which components such as organic light emitting diodes, LED sensor materials, and the like, have laminated to or on, embedded within, attached to, or applied to are provided. Such clear transparent display materials, including transparent aluminum alloys, transparent wood, transparent ceramic spinel, transparent invisible metals, and other like exotic materials, do not exhibit susceptibility to cracking, chipping, fraying, or otherwise breaking without significant harmful force applied thereto. The combination of lighted components thereto and/or therein allows for the ability to display letters, numbers, and/or graphic images on the interior or exterior of such high strength transparent articles.

BACKGROUND OF THE PRIOR ART

Businesses and advertisers have long used various method and systems to present messages and publicize goods, services, and the like, particularly through billboards, store windows, and other environmental means. More recently, the advent of computers, smart phones, and other like devices, have led to other potential means of advertisement presentations or even just the ability to provide visible digital communications. The ability to do so with resilient transparent materials has been desirable in the past, particularly with clear glass, plastic, or other like easily breakable items. Whether in terms of car windshields (or other vehicles, such as trucks, buses, and the like), windows, store windows, flat-screen devices (computers, billboards, and the like), even smartphones (and like communication devices), the ability to provide resilient structures with display capabilities have been rather limited. Dropping, for instance, computers, televisions, smartphones, and the like, without protections in place, can cause significant damage thereto; such protections may also compromise the viewable nature of the article itself. As such, the ability to utilize very strong materials for such purposes have not been investigated, particularly in terms of supplying display capabilities attached thereto. Thus, as of today, the utilization of embedded, laminated, applied, attached, or otherwise incorporated LED or like arrays for the potential presentation of digital graphics (whether in color or not, and whether as written words, numbers, combinations thereof, or drawings) has not been provided the art.

Advantages and Summary of the Invention

One advantage of the present invention, then, is the ability to utilize highly resilient transparent materials without the need for further protective coatings or applications to prevent damage thereto (from dropping, chipping, striking, etc., as examples) in combination with a display medium for see-through capability thereof. Another advantage is the provision of a full display article with an embedded, laminated, attached, applied, or otherwise incorporated digital array component for viewing therethrough such a highly resilient transparent material. Yet another advantage is the low-cost capability of utilizing a combination of highly resilient transparent material and digital display medium for a safe, reliable, versatile, and difficult-to-compromise transparent display article.

Accordingly, this invention encompasses a hard, resilient display article comprising i) a base structure of a transparent material selected from the group of aluminum alloy, exotic material, transparent wood, transparent ceramic spinel, and transparent invisible metal, ii) a transparent film that emits visible letters, numbers, messages, graphic images, and any combination thereof, through the presence of a light emitting material therein, wherein said transparent film is embedded within, laminated to the surface of, attached to, applied to, and any combination thereof, said base structure, and iii) a wireless portable unit images display and power console with digital controller and smart controller with images display. The light emitting materials may be an organic light emitting diode, a standard LED array, sensor materials, and any combination thereof, as examples.

Scientists are developing a vast array of materials that the human eyes could never see through in the past. Such materials include Transparent Wood, wherein there has been removed the molecule in wood lignin that makes it rigid and dark in color, thereby resulting colorless cellulose cell structures. The further introduction of epoxy within the previous lignin cavities generates such see-through wood materials, with high resiliency as well. Additionally, there are provided, currently, other materials that exhibit similar resiliency and transparency simultaneously. Among these are types referred to as exotic materials widely referred to as topological insulators as ultra-thin sheets of an exotic material that remains transparent and exhibits high conductance, as well. Other materials include Transparent Aluminum (monolithic window) which exhibit excellent clarity, outstanding hardness, scratch resistance and high strength. Transparent Ceramic Spinel is a likewise material that is resilient and exhibits a wide range of beneficial characteristics for optical, electronic and structural applications, including, without limitation, substitutes for windows, windshield, building window glass, and other like items. All such materials referred to above exhibit much tougher, stronger, scratch-resistant, and harder characteristics than standard glass or plastic articles (particularly those utilized as standard graphic display article base structures). Furthermore, there has been developed a transparent metallic "clay" that could lead to new super-tough screens and displays, as well. By using these materials, it has been realized that one may laminate, embed, attach, apply, or otherwise introduce light emitting arrays within thin transparent films thereto and/or therein, to provide a highly surprising result with a high resilience transparent structure that allows for low-breakage, scratching, chipping, fraying, etc., upon standard use while simultaneously providing highly effective graphic display capabilities associated with such transparent structures. Thus, a user may utilize such high strength articles to display various messages and various colorful graphic images showing on the interior or exterior of businesses, automotive windows and windshields, large-scale, personal computer, and/or hand-held communication/computerized electronics, flexible electronic devices, and other like items. The further inclusion of the main control panel with these devices for facilitated controls (generation messages, graphics, and the like, as examples, on demand and immediately if desired) may be employed utilizing attachments like a stylus pen, a keypad, an optical input, a touch screen, and voice recognition, as possible alternatives). The overall method and system is described in greater depth below.

DESCRIPTION OF THE DRAWINGS AND PREFERRED EMBODIMENTS

The following descriptions and examples are merely representations of potential embodiments of the present disclosure. The scope of such a disclosure and the breadth thereof in terms of claims following below would be well understood by the ordinarily skilled artisan within this area.

Figure 1:
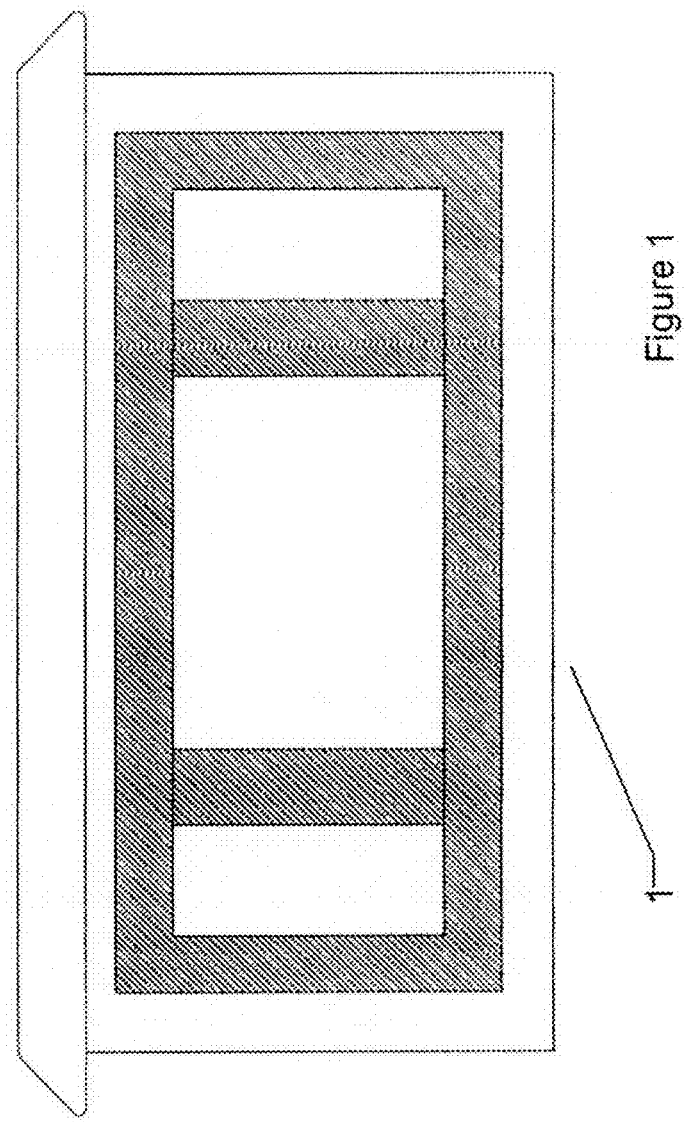
FIG. 1 displays a house window glass utilizing an inventive base structure, light emitting array film, and controller.

FIG. 1. With Clear Transparent display material embedded, laminate, attach, apply or et al., to one of this materials Aluminum Alloy 2, Transparent Ceramic 3, Transparent Wood 4, Exotic Material 5 and Invisible Metal 6. One can display, as an example, his or her address (or message, information, graphic, etc.) on the interior or exterior 1, using one of this materials that will be strong and unbreakable then glass or plastic.

Figure 2:
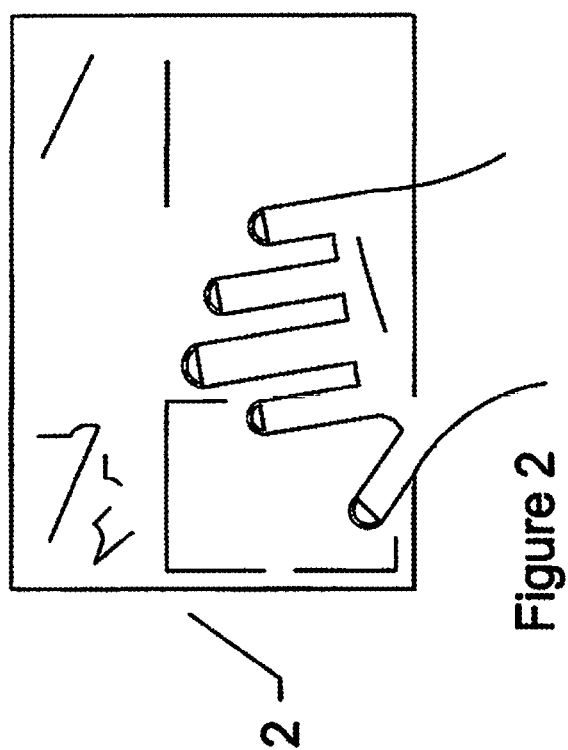
FIG. 2 displays a clear Aluminum Alloy base structure.

FIG. 2. Aluminum Alloy 2 is a product of ALON this material can be used for clear vision technology, which will have the Clear Transparent display material embedded, laminate, attach, and apply or otherwise incorporate thereon and/or thereto.

Figure 3:
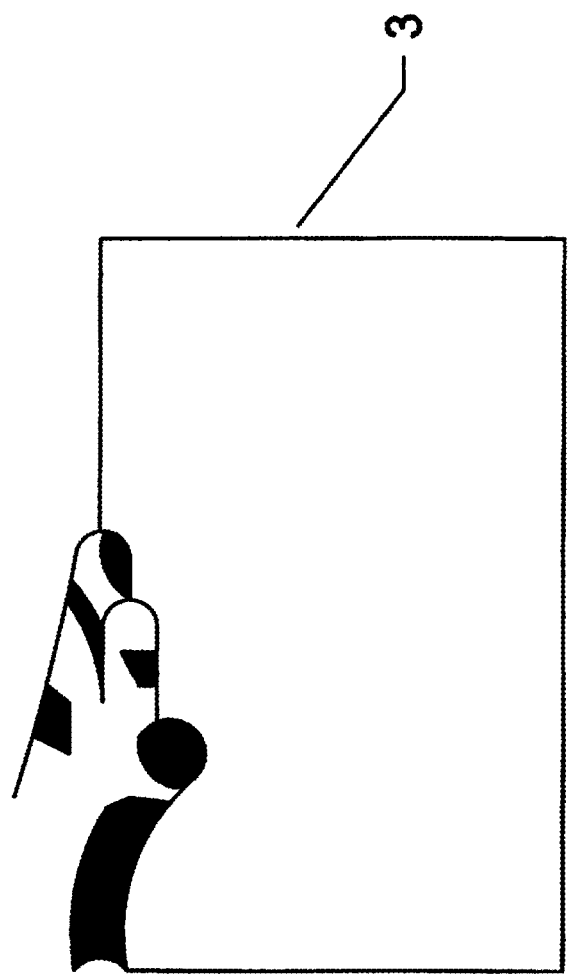
FIG. 3 displays a clear Transparent Ceramic base structure.

FIG. 3. Transparent Ceramics 3 have various application such as IR windows and domes, mainly to their processing flexibility in fabricating items with large size and complex shapes, which will have the Clear Transparent display material embedded, laminated, attached, applied, or otherwise introduced therein and/or thereto. This material is clear like glass and plastic, but unbreakable, contrary to such glass or plastic materials.

Figure 4:
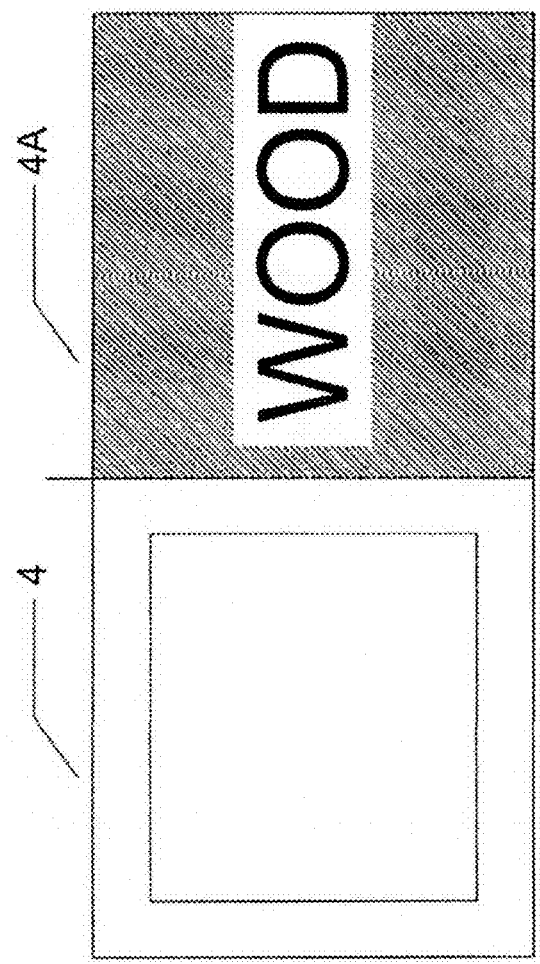
FIG. 4 displays a piece of transparent wood as well as a comparative opaque wood piece.

FIG. 4. Transparent Wood 4 see through wood are stronger and a better insulator than glass, and more biodegradable than plastic, using the Clear Transparent display material embedded, laminated, attached, applied, or otherwise introduced therein and/or thereto, by light emitting film components to said base structure, can show images and graphic on the interior or exterior of transparent wood 4.

Figure 5:
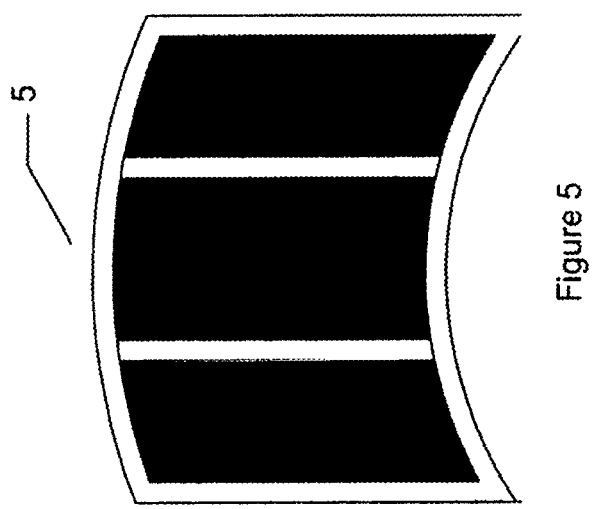
FIG. 5 displays an ultra-thin sheet of a transparent and flexible Exotic Material.

FIG. 5. Exotic material 5 can replace glass or plastic in electronics devices, office building windows glass, house window glasses, automotive glass and et al., it will prevent scratch, unbreakable, cracking, chipping, fraying. Such a Clear Transparent material can be embedded, laminated, attached, applied, or otherwise introduced therein and/or thereto, by light emitting film components to Exotic material 5 to display letters, numbers or graphic images.

Figure 6:
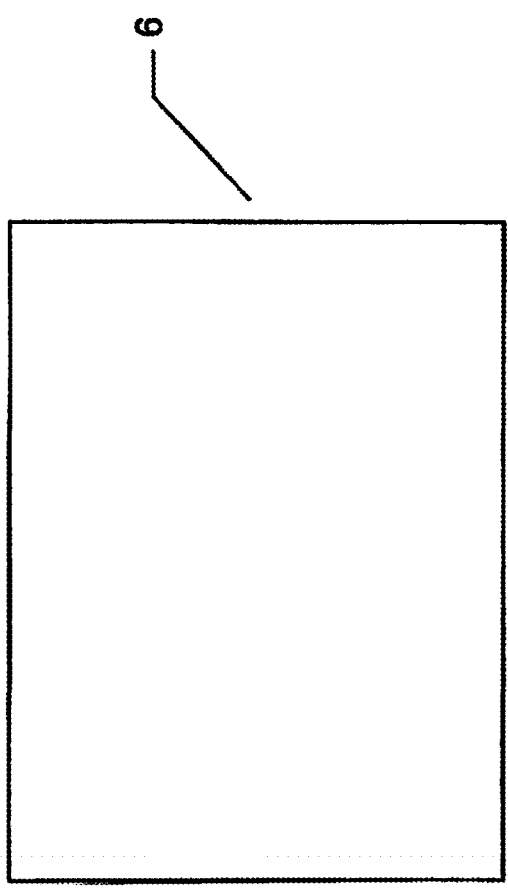
FIG. 6 displays a piece of Transparent Invisible Metal.

FIG. 6. Transparent Invisible metal 6 is a material that can be used for office building, homes or automotive on the interior or exterior clear like glass or plastic, by using such a Clear Transparent material embedded, laminated, attached, applied, or otherwise introduced therein and/or thereto including light emitting film components.

Figure 7:
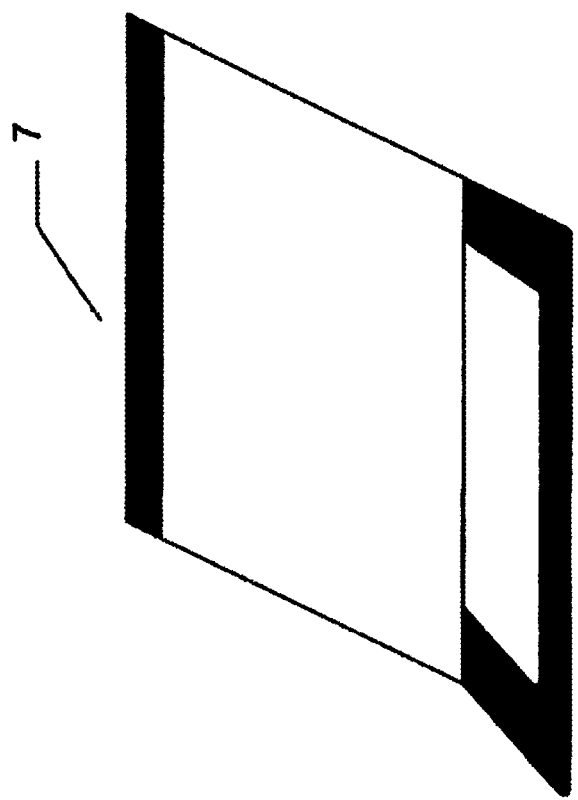
FIG. 7 displays a computer screen showing substitute inventive base structures in place of standard materials.

FIG. 7. Displays a computer screen 7 made out of these clear materials: Aluminum Alloy 2; Transparent Ceramic 3; Transparent Wood 4; Exotic Material 5 and Invisible Metal 6 these material are not like glass or plastic material, they will not scratch, crack, chip, fray and are unbreakable. Such a Clear Transparent material may be embedded, laminated, attached, applied, or otherwise introduced therein and/or thereto, by light emitting film components to one of these material to display numbers, letters or graphic images.

Figure 8:
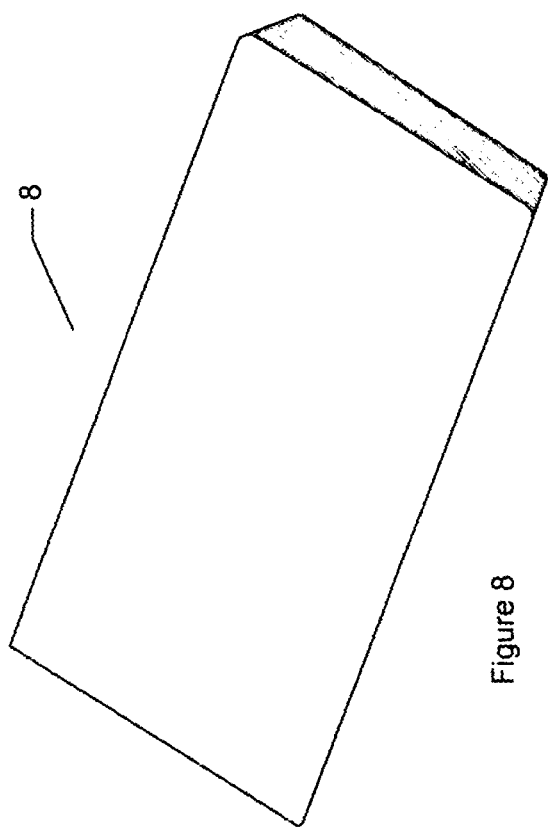
FIG. 8 displays a cell phone screen using a substitute resilient transparent material base structure of the invention.

FIG. 8. Cell phones 8 are made out of these materials: Aluminum Alloys; metals and plastic. Transparent Wood 4 and Transparent Ceramic 5. Such a cell phone screen material 8 may be embedded, laminated, attached, applied, or otherwise introduced therein and/or thereto, by light emitting film components to the Clear Transparent material to display letters, numbers and graphic images.

Figure 9:
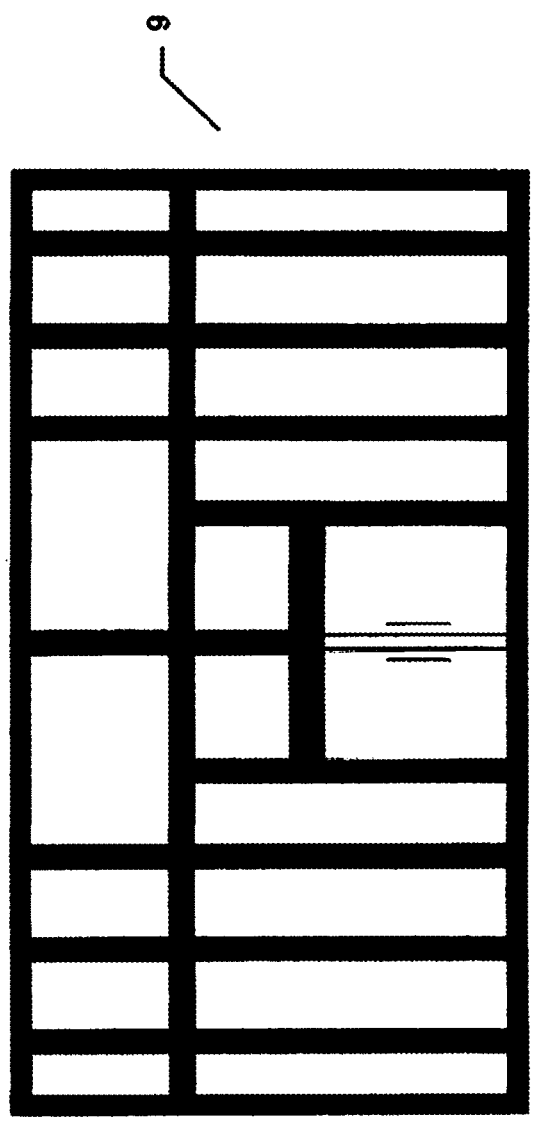
FIG. 9 displays a commercial building clear window article with the inventive device therein.

FIG. 9. Commercial building windows 9 are made of Aluminum, Wood, Vinyl, and Fiberglass. These materials are being made clear like glass, they also can be used to produce building windows, they are Transparent Ceramic 3, Exotic Material 5 and Transparent Invisible Metal 6. Such articles may be embedded, laminated, attached, applied, or otherwise introduced therein and/or thereto, by light emitting film components to the Clear Transparent material to display letters, numbers and graphic images.

Figure 10:
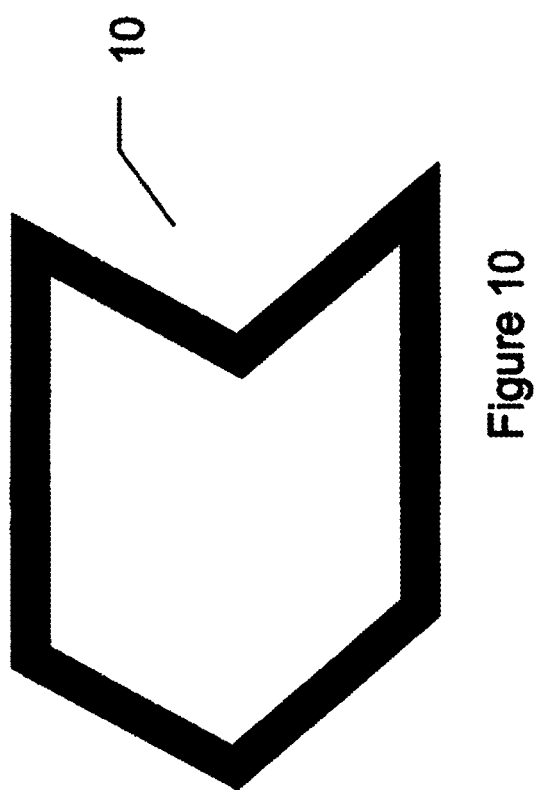
FIG. 10 displays flexible electronics of the invention.

FIG. 10. Flexible electronics devices 10 are made out of plastic substrates, as technology changes engineering and scientist are looking at new materials that can show clear like glass, plastic materials and exhibit flexibility, as well. Such base structure materials may be Aluminum Alloy 2, Transparent Ceramic 3, Transparent Wood 4, Exotic Material 5 and Transparent Invisible Metal 6. Such materials can prevent scratch, crack, chip, fray and are unbreakable. As above, such flexible materials may be embedded, laminated, attached, applied, or otherwise introduced therein and/or thereto, by light emitting film components to display numbers, letters or graphic images.

Figure 11:
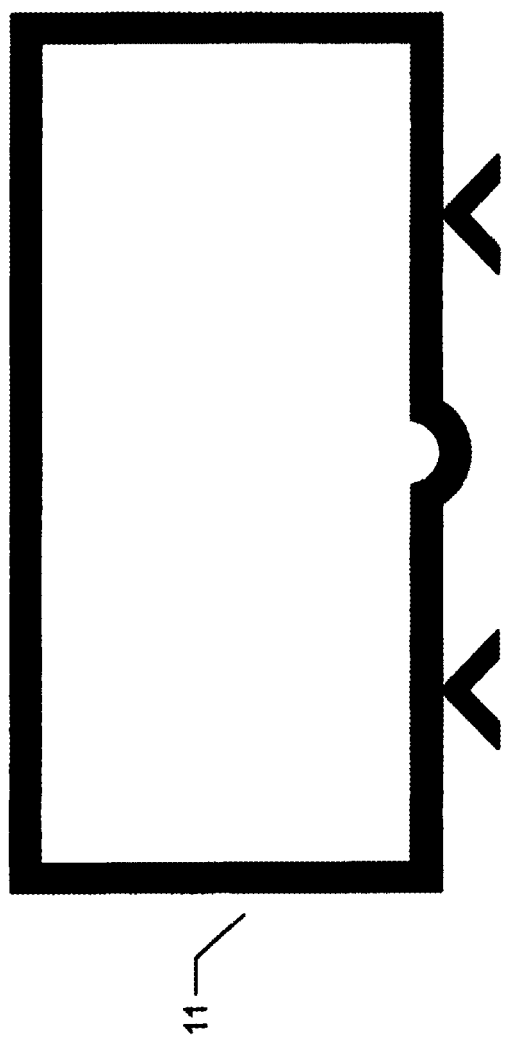
FIG. 11 displays a flat screen TV made of the invention.

FIG. 11. Changes to TV flat screens include slimmer and thinner structures, with the ability to hang on walls and like structures. The current invention allows for the replacement of the glass or plastic screen for greater resiliency and reliability. Thus, the utilization of the base structures such as Aluminum Alloy 2, Transparent Ceramic Spinel 3, Transparent Wood 4, Exotic Material 5, and Transparent Invisible Metal 6 allows for improvements as to screen strength and the prevention or reduction of propensity for scratching, cracking, chipping, fraying and breaking, is available through the utilization of the invention device/article as described. Thus, when the base structure is embedded, laminated, attached, or applied, or otherwise incorporated with the Clear Transparent materials including, for instance, organic light emitting diodes, LED, sensor materials or other like components, allows for such desirable and on-demand displays of letters, numbers, messages, information, and/or graphic images thereon (internally and/or externally).

Figure 12:
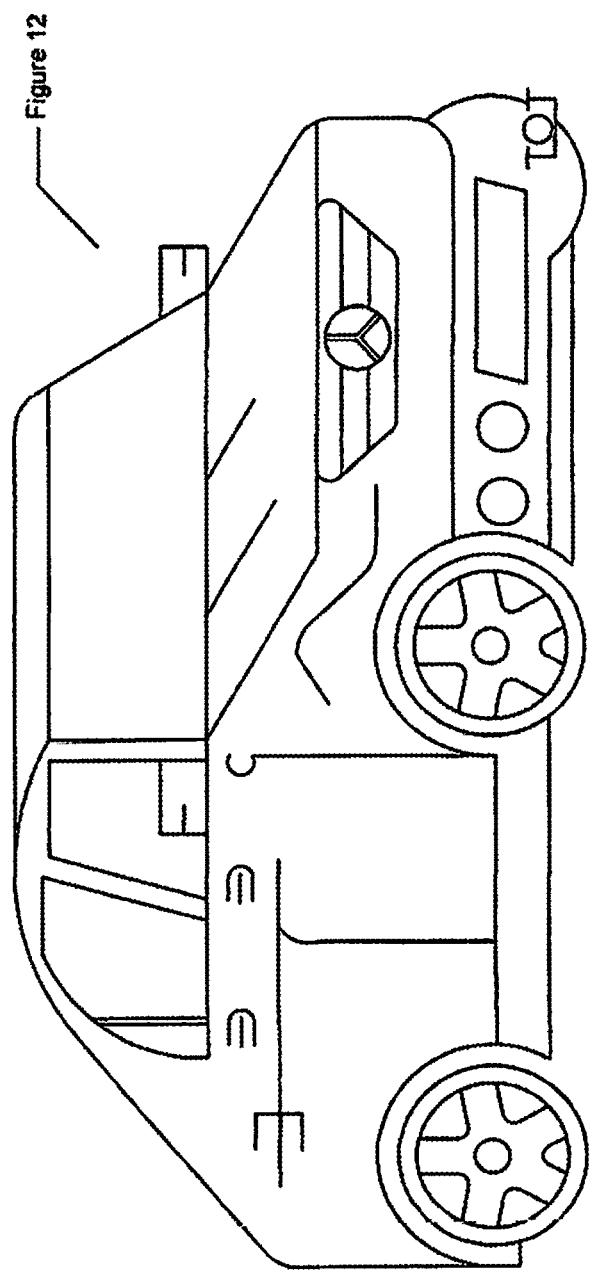
FIG. 12 displays an automotive showing laminate windshield glass and door glass having the invention thereon.

FIG. 12. Shows an automotive windshield glass and windows glass with the inventive base structure and clear film with light emitting diodes, for example, present therein or thereon. Certainly, transportation glass materials are changing with updated technology but nothing with the base structures indicated herein has not been considered. With the inventive base structure materials, then, there will be drastically reduced potential for scratching, cracking, chipping, fraying, and breaking; coupled with the clear film, then, a drastic improvement is permitted. By using materials like Aluminum Alloy 2, Transparent Ceramic Spinel 3, Transparent Wood 4, Exotic Material 5 and Transparent Invisible Metal 6, manufacture is provided through embedded, laminated, attached or applied clear films with organic light emitting diodes, LED or sensor materials. In this manner, as before, such a resilient base structure coupled with the Clear Transparent materials, and the controller portions thereof, the ability to display letters, numbers, information, messages, and/or graphic images on the interior or exterior of transportation article(s) are permitted.

Figure 13:
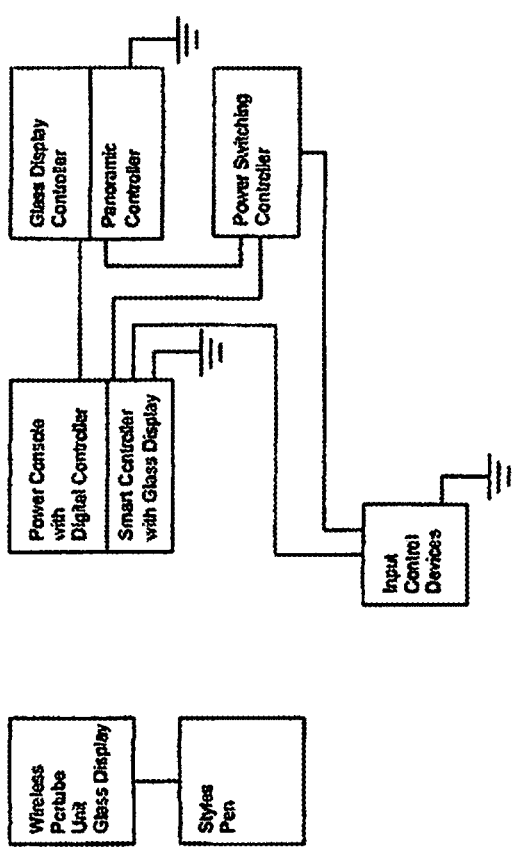
FIG. 13 displays a control panel wireless portable unit images display, power console with digital controller, smart controller with images display, images display controller, panoramic controller and input control device and power switching controller.

FIG. 13 shows a wireless portable unit is a SIM card with glass inside the control panel that can work with a stylus pen or key pad to input commands to transparent film. A Power console with digital controller sent data to glass display controller with panoramic controller if more than one glass display, connect to power switching controller. Smart controller with images display sent data to input control devices which could be one of these devices: optical input, stylus pen, touch screen or voice recognition power by power switching controller, power switching controller can received power for power system controller, auxiliary power, solar panels or battery.

Thus, a base structure of unique transparent resilient material that is embedded within, laminated with, attached to, applied with, and/or otherwise incorporated with light emitting film components and included with an on-demand controller unit is provided for a novel article of high resilience display capabilities.

I claim:

1. A transparent display device comprising:
   i) a base structure of a transparent material selected from the group of transparent aluminum alloy, transparent exotic material, transparent wood, transparent ceramic spinel, and transparent invisible metal,
   ii) a transparent film emits organic light emitting diodes and LED sensors, while further emitting visible letters, numbers, messages, graphic images, and any combination thereof, through said light emitting diodes,
   wherein said transparent film is coupled to said base structure, said coupling including embedding within, laminating to the surface of, attaching to the surface of, or applying to the surface of,
   and iii) a wireless portable unit with image display is attached directly to said transparent film wherein said display is configured to display input commands to said transparent film;
   wherein said unit includes a power console with a smart digital controller, wherein said smart digital controller is configured to send data to said display.

2. The device of claim 1 wherein said transparent film includes organic light emitting diodes.

3. The device of claim 1 wherein said transparent film includes a LED array.

4. The device of claim 1 wherein said transparent film includes sensor materials.

5. The device of claim 1 wherein said transparent film is embedded within said base structure.

6. The device of claim 1 wherein said transparent film is laminated to the surface of the base structure.

7. The device of claim 1 wherein said transparent film is attached to the surface of the base structure.

8. The device of claim 1 wherein said transparent film is applied to the surface of the base structure.

9. The device of claim 1 wherein said base structure is transparent aluminum alloy.

10. The device of claim 1 wherein said base structure is transparent exotic material.

11. The device of claim 1 wherein said base structure is transparent wood.

12. The device of claim 1 wherein said base structure is transparent ceramic spinel.

13. The device of claim 1 wherein said base structure is transparent invisible metal.

14. The device of claim 1 wherein said transparent materials are laminated to, embedded within, attached to, or applied to said transparent invisible metal.

15. The device of claim 1 wherein said wireless portable unit with image display is operated through an optical unit, a touch screen, voice recognition, a stylus pen, or any combination thereof.

16. The device of claim 1 wherein said power console with digital controller is capable of operating an images display controller and a panoramic controller, and power is operated through a power switching controller, said power switching controller including generators selected from the group of: a power system controller, an auxiliary power generator, solar panels and a battery.

17. The device of claim 1 wherein said smart controller image display is capable of operating an input control device, said input control device including controlling components selected from the group of: an optical unit, a stylus pen, a touch screen, a voice recognition module, and power by a power switching controller.

* * * * *